F. BERGER.
VEHICLE SPRING.
APPLICATION FILED FEB. 6, 1909.

932,241.

Patented Aug. 24, 1909.

Witnesses.
William M. Rivoir.
Willa A. Burrowes

Inventor:-
Frederick Berger.
by his Attorneys.-
Howson & Howson

UNITED STATES PATENT OFFICE.

FREDERICK BERGER, OF PHILADELPHIA, PENNSYLVANIA.

VEHICLE-SPRING.

932,241. Specification of Letters Patent. Patented Aug. 24, 1909.

Application filed February 6, 1909. Serial No. 477,038.

*To all whom it may concern:*

Be it known that I, FREDERICK BERGER, a citizen of the United States, residing in Philadelphia, Pennsylvania, have invented certain Improvements in Vehicle-Springs, of which the following is a specification.

Figure 1:
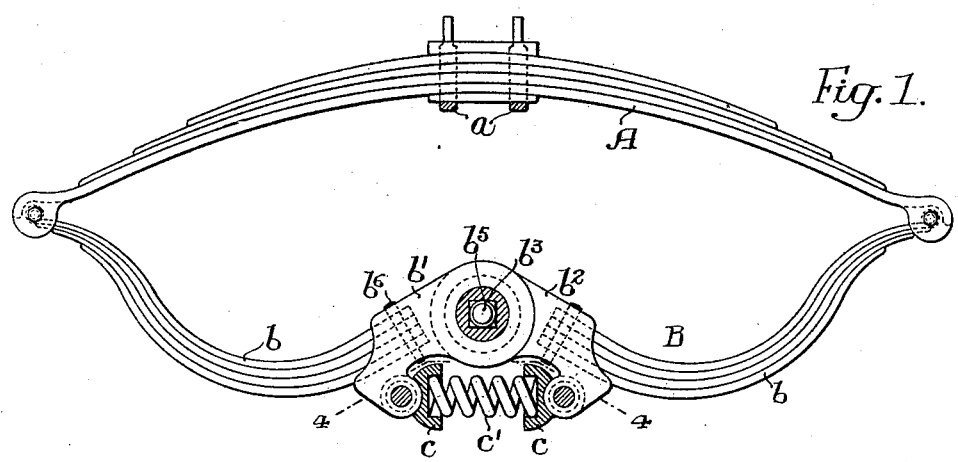
Figure 2:
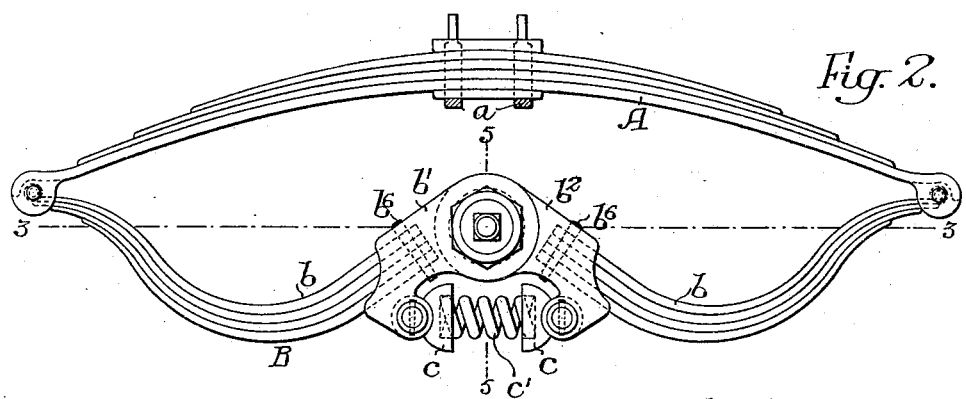
Figure 3:
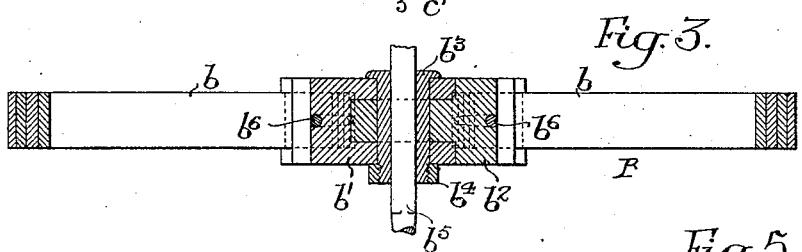
Figure 4:
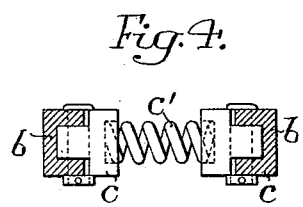
Figure 5:
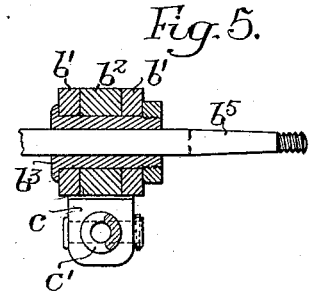

One object of my invention, is to so construct a vehicle spring that for a given amount of material it shall be relatively strong and at the same time highly resilient. I further desire to so dispose the material of the spring that the liability of its breakage under even the most severe operating conditions shall be reduced to a minimum, while in addition, its recovery after the removal of a load is greatly facilitated. These objects and other advantageous ends I secure as hereinafter set forth, reference being had to the accompanying drawings, in which:

Figure 1, is a side elevation, partly in section, illustrating my improved spring in its normal or uncompressed condition; Fig. 2, is a side elevation, illustrating the spring shown in Fig. 1, with its parts in the positions occupied under load; Fig. 3, is a horizontal section on the line 3—3, Fig. 2; Fig. 4, is a section on the line 4—4, Fig. 1; and Fig. 5, is a section on the line 5—5, Fig. 2.

In the above drawings A represents the upper member of my improved spring, and this will be seen to consist of a series of leaves arranged in the manner characteristic of most elliptical springs. This member has a curved form and at its central portion are mounted straps $a$ whereby its parts are held together and the spring as a whole is attached to the load to be supported.

The second member B of the spring consists of two elements $b$, preferably though not necessarily, reversely curved and pivoted together and to the ends of the member A. For the purpose of such pivoting, the adjacent ends of said elements are provided with two castings $b'$ and $b^2$ forming heads which fit together as shown in Fig. 5.

The connecting pivot consists of a tubular bolt $b^3$ having a nut $b^4$ designed to pass through suitable openings in the two heads; the axle or other supporting member $b^5$ for the spring passing through said bolt $b^3$.

For convenience in attaching the two spring elements $b$ to their respective heads, I provide pins $b^6$ passing through said elements and through the heads, and it will be noted that the arrangement is such that while said elements $b$ are bowed outwardly, by combining them as illustrated, the resilient member B formed by them together is inwardly bowed at its center.

Each of the heads $b'$ and $b^2$ has pivoted to it a cup shaped casting $c$ and these two castings are in line so as to properly receive and support a coiled spring $c'$. As a result of this construction, when a load is applied to the spring, the various parts which normally occupy the positions shown in Fig. 1, assume or tend to assume the positions shown in Fig. 2, and for this purpose the spring elements $b$, instead of being flat or so slightly curved as to be flat in effect, as would ordinarily be the case with an elliptic spring, are subjected to an end compression which bows them to a greater extent than exists when they are unloaded, while the central portion of the member A approaches the supporting member B. In order to assist in limiting this downward movement of the member A and consequently of the body supported thereon, I provide the spring $c'$ which tends to push apart the two cups $c$ and thereby increase the angle between the center lines of the head ends of the elements $b$. Said spring thus acts with said elements $b$ to resist their bowing when a load is applied to the device and effectually prevents the member A approaching too closely to the member B under an abnormal load, as well as assists in restoring the parts to their normal position after a load has been removed.

I claim:

1. The combination in a spring of two members of which one consists of two reversely curved elements pivoted to each other and to the first member.

2. The combination in a spring of two members of which one consists of two spring elements each pivoted to an end of the first member and curved so that their adjacent ends extend upward toward the middle of said first member, with means for directly pivoting said ends together.

3. The combination in a spring of two members of which one consists of two outwardly bowed elements operatively connected to the other member of the spring, with means for operatively connecting said two elements so that the member formed by them is inwardly bowed at its center.

4. The combination in a spring of two members of which one consists of two elements respectively pivoted to the ends of the first member and curved so that their adjacent ends extend upwardly toward the middle of said member, means for pivoting together said adjacent ends, with a spring extending between portions of the adjacent ends of said two spring elements and substantially on the level of their lowermost parts.

In testimony whereof, I have signed my name to this specification, in the presence of two subscribing witnesses.

FREDERICK BERGER.

Witnesses:
 WILLIAM E. BRADLEY,
 JOS. H. KLEIN.